US008616388B2

(12) United States Patent
Butler (10) Patent No.: US 8,616,388 B2
(45) Date of Patent: Dec. 31, 2013

(54) ADJUSTABLE SHELVING ASSEMBLY (75) Inventor: Eric Butler, Middleville, MI (US)

(73) Assignee: Advance Caster & Wheel Co., Inc., Grand Rapids, MI (US)

( * ) Notice: Subject to any disclaimer, the term of this patent is extended or adjusted under 35 U.S.C. 154(b) by 161 days.

(21) Appl. No.: 13/155,073

(22) Filed: Jun. 7, 2011

(65) Prior Publication Data

US 2012/0312766 A1    Dec. 13, 2012

(51) Int. Cl.
*A47B 57/06* (2006.01)
*A47B 9/06* (2006.01)

(52) U.S. Cl.
USPC ............................ 211/187; 211/175; 108/106

(58) Field of Classification Search
USPC ........... 211/90.01, 90.02, 149, 153, 175, 186, 211/187, 189, 190, 191, 192, 195, 207, 211/208; 108/106, 107, 108, 109, 110, 108/147.11, 147.16; 312/319.5–319.8, 351, 312/408; 187/240, 244, 270
See application file for complete search history.

(56) References Cited

U.S. PATENT DOCUMENTS

| 256,363 A | | 4/1882 | Nourse | |
|---|---|---|---|---|
| 467,096 A | * | 1/1892 | Harper | 182/17 |
| 849,222 A | * | 4/1907 | Fleming | 182/62.5 |
| 991,137 A | * | 5/1911 | Chesnutt | 187/233 |
| 1,091,615 A | | 3/1914 | Angell | |
| 1,297,619 A | * | 3/1919 | Wessmann | 187/244 |
| 1,403,486 A | * | 1/1922 | Cooney | 187/244 |
| 2,830,825 A | | 4/1958 | Webber et al. | |
| 2,841,459 A | | 7/1958 | Sharpe | |
| 3,025,651 A | * | 3/1962 | Stanley | 53/386.1 |
| 3,132,609 A | | 5/1964 | Chesley | |
| 3,199,683 A | | 8/1965 | Graswich | |
| 3,313,376 A | * | 4/1967 | Holland, Sr. | 187/241 |
| 3,786,947 A | | 1/1974 | Craft, III | |
| 3,891,228 A | | 6/1975 | Rhinehart et al. | |
| 3,982,801 A | * | 9/1976 | Heidorn et al. | 312/306 |
| 3,999,775 A | | 12/1976 | Brongo | |
| 4,302,023 A | | 11/1981 | Kiesz | |
| 4,428,304 A | | 1/1984 | Moser | |
| 4,457,239 A | | 7/1984 | Heinze | |
| 4,512,591 A | | 4/1985 | Plante | |
| 4,590,865 A | | 5/1986 | Rutsche et al. | |
| 4,620,489 A | | 11/1986 | Albano | |
| 4,967,733 A | * | 11/1990 | Rousseau | 182/13 |
| 5,042,863 A | | 8/1991 | Fraga | |
| 5,090,337 A | | 2/1992 | Magistrelli | |
| 5,199,778 A | | 4/1993 | Aoki et al. | |

(Continued)

FOREIGN PATENT DOCUMENTS

| EP | 0438180 A2 | 1/1991 |
|---|---|---|
| JP | 6034265 A | 2/1994 |
| JP | 2004173959 A | 6/2004 |

*Primary Examiner* — Joshua Rodden
(74) *Attorney, Agent, or Firm* — Price Heneveld LLP (57) ABSTRACT A shelving assembly including a frame including a plurality of support columns. A shelf unit includes a plurality of sides disposed inside the frame. A gear assembly is disposed adjacent to one of the plurality of sides of the shelf unit. The gear assembly includes a drive shaft, a translational shaft and a translational gear disposed on a distal end of the translational shaft. A vertically-extending toothed rack is positioned on the frame. The vertically-extending toothed rack is operably engaged with the translational gear such that rotation of the drive shaft causes rotation of the translational shaft and rotation of the translational gear, which results in vertical translation of the shelf unit.

10 Claims, 10 Drawing Sheets

(56) References Cited

U.S. PATENT DOCUMENTS

| | | | |
|---|---|---|---|
| 5,373,793 A | 12/1994 | Crossman | |
| 5,718,441 A | 2/1998 | Kern et al. | |
| 5,913,584 A * | 6/1999 | Swindell et al. | 312/408 |
| 6,024,025 A | 2/2000 | Koch et al. | |
| 6,065,821 A | 5/2000 | Anderson et al. | |
| 6,402,167 B1 | 6/2002 | Calleja | |
| 6,505,900 B2 | 1/2003 | Frederick | |
| 6,540,249 B2 | 4/2003 | King | |
| 6,802,576 B2 | 10/2004 | Shepherd | |
| 6,814,362 B2 | 11/2004 | Hanson et al. | |
| 7,293,813 B2 | 11/2007 | Squyres et al. | |
| 8,047,619 B2 * | 11/2011 | Amstutz et al. | 312/117 |
| 8,047,623 B2 * | 11/2011 | Kang et al. | 312/408 |
| 8,267,493 B2 * | 9/2012 | Kim | 312/408 |
| 8,333,448 B2 * | 12/2012 | Yoon et al. | 312/408 |
| 2004/0250739 A1 | 12/2004 | Yang | |
| 2008/0203041 A1 | 8/2008 | Lim et al. | |
| 2008/0230502 A1 | 9/2008 | Poortvliet et al. | |
| 2008/0251482 A1 | 10/2008 | Davis et al. | |
| 2008/0251483 A1 | 10/2008 | Davis et al. | |
| 2009/0261704 A1 | 10/2009 | Benz et al. | |
| 2009/0266775 A1 | 10/2009 | Vanderhoek et al. | |
| 2010/0096344 A1 | 4/2010 | Vanderhoek et al. | |
| 2010/0176703 A1 * | 7/2010 | Kim | 312/408 |
| 2010/0176704 A1 | 7/2010 | Kim | |
| 2011/0001415 A1 * | 1/2011 | Park et al. | 312/408 |

* cited by examiner

ADJUSTABLE SHELVING ASSEMBLY

BACKGROUND OF THE INVENTION

The present invention generally relates to a adjustable shelving assembly, and more specifically, to a shelving assembly that includes vertically and horizontally adjustable shelves.

SUMMARY OF THE PRESENT INVENTION

One aspect of the present invention includes a shelving assembly including a frame including a plurality of support columns. A shelf unit includes a plurality of sides disposed inside the frame. A gear assembly is disposed adjacent to one of the plurality of sides of the shelf unit. The gear assembly includes a drive shaft. A translational shaft includes a proximal end and a distal end. The proximal end is operably connected with the drive shaft. A translational gear is disposed on the distal end of the translational shaft. A vertically-extending toothed rack is positioned on one of the first and second end members. The vertically-extending toothed rack is operably engaged with the translational gear such that rotation of the drive shaft causes rotation of the translational shaft and rotation of the translational gear, which results in vertical translation of the shelf.

Another aspect of the present invention includes a shelving assembly including a shelf unit disposed inside a rack assembly. The shelf unit includes a drive shaft operably connected with a translation shaft that extends below the shelving unit. At least one gear is disposed on a distal end of the translation shaft. The at least one gear is operably connected with a vertically-extending toothed rack, such that rotation of the drive shaft results in rotation of the translation shaft, which results in rotation of the at least one gear relative to the vertically-extending toothed rack to provide for vertical translation of the shelf unit between a raised position and a lowered position.

Yet another aspect of the present invention includes a shelving assembly including a frame having a plurality of support columns. A shelf unit is disposed inside the frame and includes first and second end members. A first gear assembly is disposed adjacent to at least one of the first and second end members. The gear assembly is adapted to vertically translate the shelf between raised and lowered positions inside the frame. A second gear assembly includes a width adjustment shaft. An elongate width adjustment member is operably connected with the width adjustment shaft, wherein actuation of the width adjustment member causes the width adjustment shaft to retract at least one of the first and second end members, thereby causing the distance between the first and second end members to decrease.

These and other aspects, objects, and features of the present invention will be understood and appreciated by those skilled in the art upon studying the following specification, claims, and appended drawings.

DETAILED DESCRIPTION OF EMBODIMENTS

Figures 1, 2, 2A:
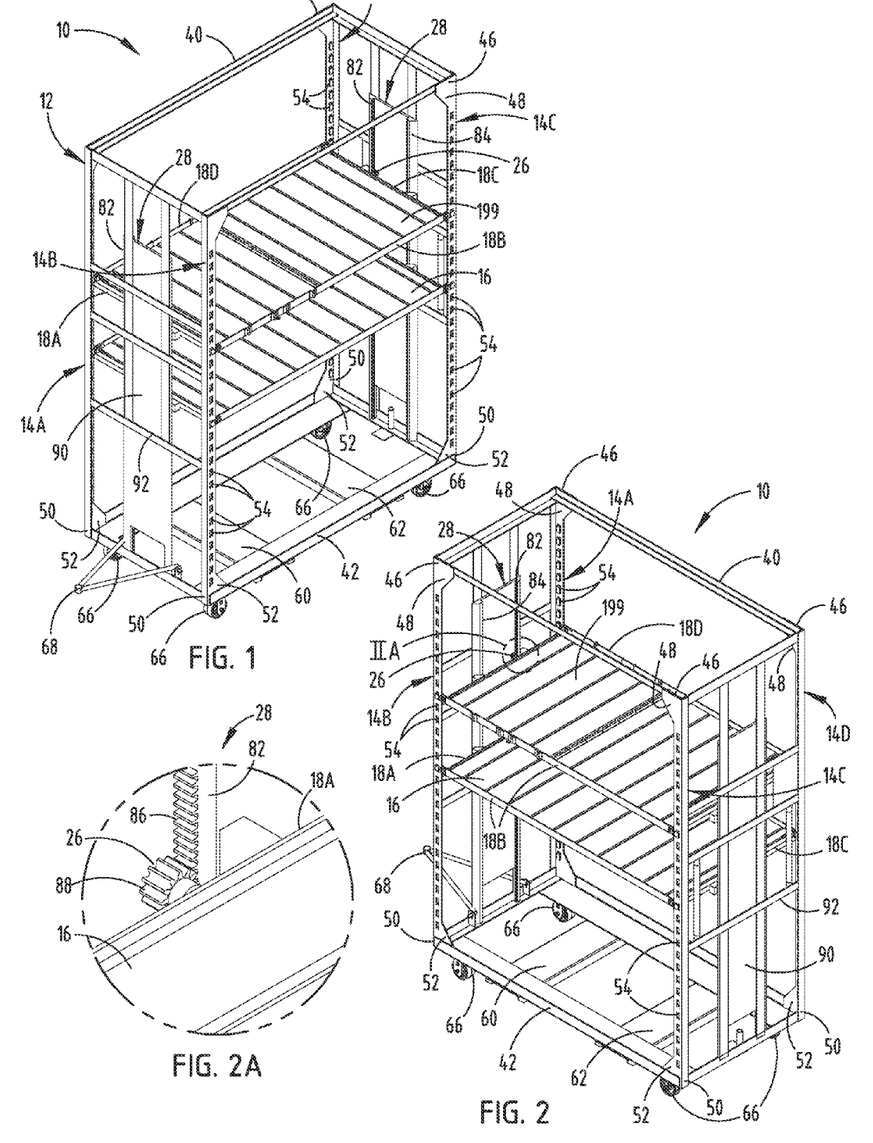
FIG. 1 is a front perspective view of a adjustable shelving assembly of the present invention.
FIG. 2 is a rear perspective view of the adjustable shelving assembly of FIG. 1.
FIG. 2A is an enlarged perspective view of area IIA of FIG. 2.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 and 2, the reference numeral 10 generally designates a shelving assembly having a cage 12 including a plurality of support columns 14A, 14B, 14C, and 14D. A shelf 16 includes a plurality of side members 18A, 18B, 18C, and 18D. A gear assembly 20 is disposed adjacent to the shelf 16. The gear assembly 20 includes at least one drive shaft 22 operably connected to a translational shaft 24 that is operably connected to a translational gear 26. A vertically-extending toothed rack assembly 28 is positioned on the cage 12. The vertically-extending toothed rack assembly 28 is operably engaged with the translational gear 26 such that rotation of the drive shaft 22 causes rotation of the translational gear 26, which in turn results in vertical movement of the shelf 16.

Referring again to FIGS. 1 and 2, the frame 12 of the shelving assembly 10 generally includes a top frame member 40 and a bottom frame member 42. The top frame member 40 is connected with the bottom frame member 42 via the support columns 14A, 14B, 14C, and 14D. In the illustrated embodiment, the plurality of support columns 14A, 14B, 14C, and 14D include a first support column 14A, a second support column 14B, a third support column 14C, and a fourth support column 14D generally disposed at corners of the cage 12. Each support column 14A, 14B, 14C, and 14D includes a top end 46 with a widened connecting portion 48 adapted to support the top frame member 40. A bottom end 50 of each support column 14A, 14B, 14C, and 14D includes a widened portion 52 adapted to connect with the bottom frame member 42. Each support column 14A, 14B, 14C, and 14D includes a multitude of apertures 54 for engagement with the shelf 16, as described in further detail herein (FIG. 4).

Figure 3:
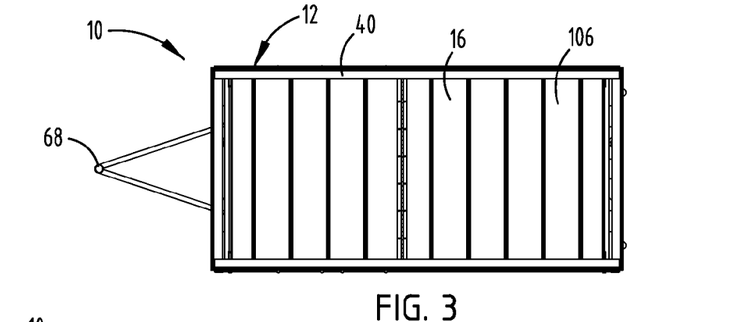
FIG. 3 is a top plan view of a shelf of the adjustable shelving assembly of FIG. 1.
Figure 4:
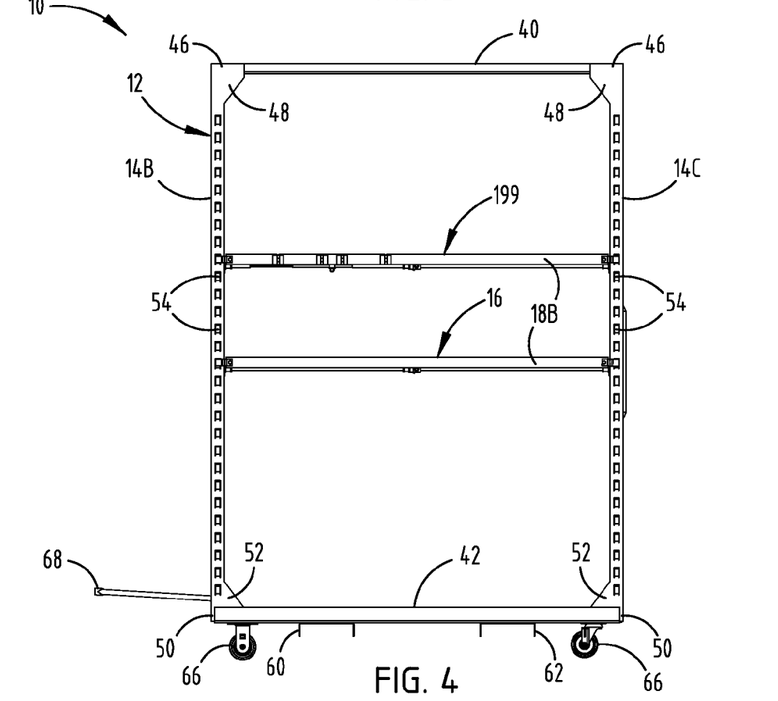
FIG. 4 is a side elevational view of the adjustable shelving assembly of FIG. 1.
Figure 5:
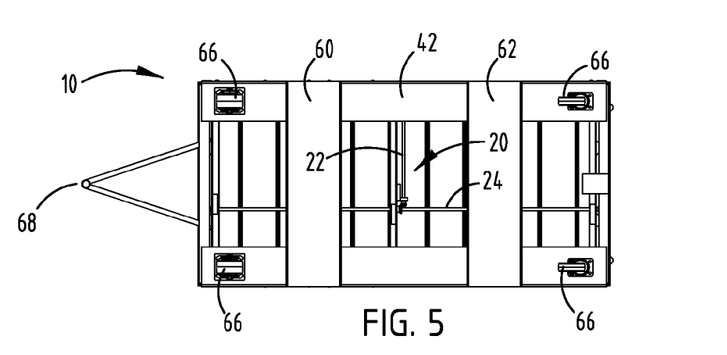
FIG. 5 is a bottom plan view of the adjustable shelving assembly of FIG. 1.
Figure 6:
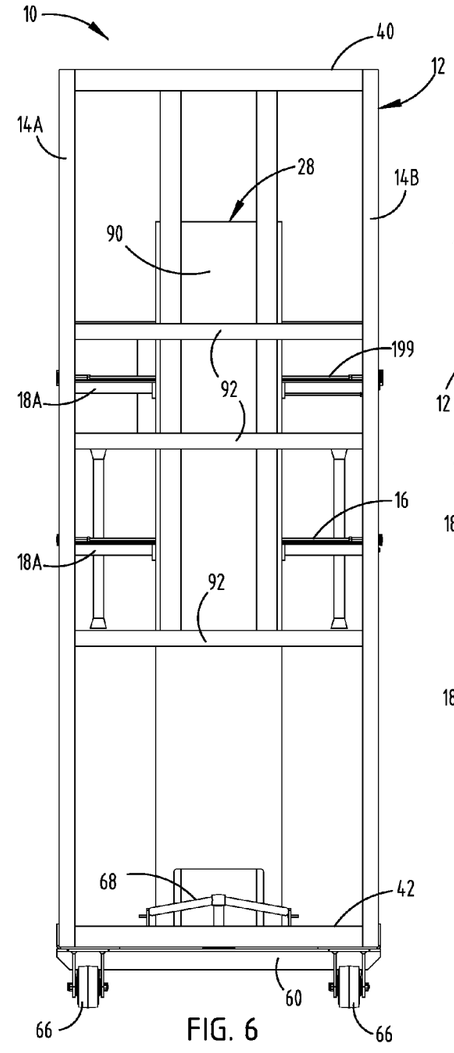
FIG. 6 is a front elevational view of the adjustable shelving assembly of FIG. 1.
Figure 7:
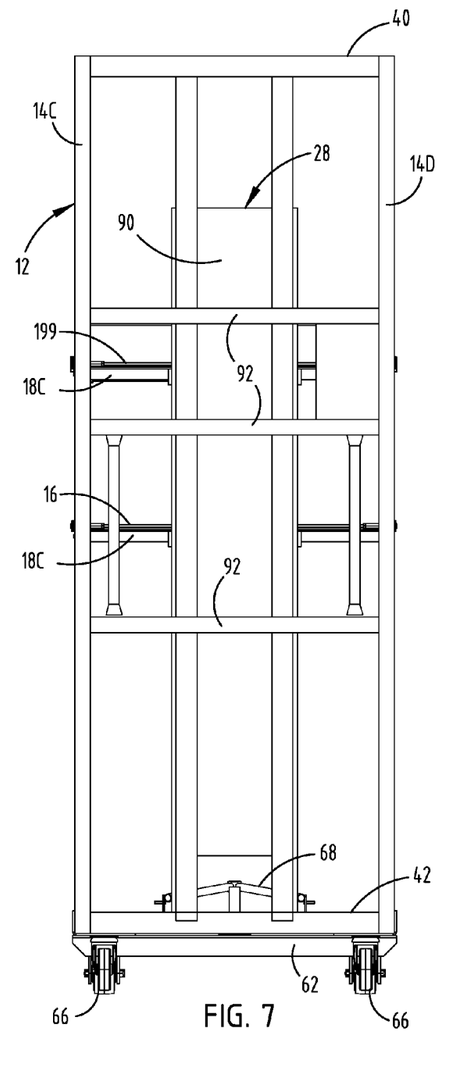
FIG. 7 is a rear side elevational view of the adjustable shelving assembly of FIG. 1.

Referring now to FIGS. 3-5, the bottom frame member 42 includes first and second horizontal supports 60, 62 that provide additional structural rigidity to the bottom frame member 42. In addition, a plurality of wheels 66 are provided below the bottom frame member 42. It is contemplated that each of the wheels 66 may be swivel wheels, or fixedly aligned wheels, that are oriented in a fixed relationship relative to the cage 12, such that the direction of rotation of the wheels 66 is a constant. One end of the bottom frame member 42 includes a hitch device 68 adapted to connect with another shelving assembly 10 or with a vehicle, such as a landscaping tractor, allowing for ease in mobility of the shelving assembly 10.

Referring now to FIGS. 1-2A, 6, and 7, the vertically-extending toothed rack assemblies 28 are disposed between the first and second support columns 14A, 14B, as well as the third and fourth support columns 14C, and 14D. Each vertically-extending toothed rack assembly 28 includes first and second rack members 82, 84 that include teeth 86 adapted to engage teeth 88 of the translational gear 26 that extends from the shelf 16, and which is operably connected with the translational shaft 24 positioned below the shelf 16. However, it is contemplated that only one of the first and second rack members 82, 84 may include teeth that are adapted to engage the translational gear 26. A support web 90 extends between the first and second rack members 82, 84. In addition, a multitude of lateral supports 92 are positioned between the first and second support columns 14A, 14B, as well as the third and fourth support columns 14C, 14D.

Figure 8:
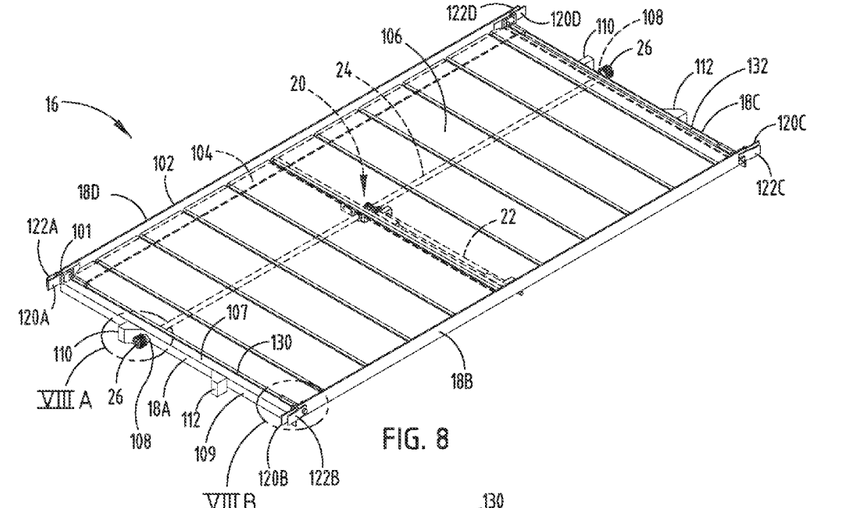
FIG. 8 is a top perspective view of a shelf of the adjustable shelving assembly of FIG. 1.
Figure 8A:
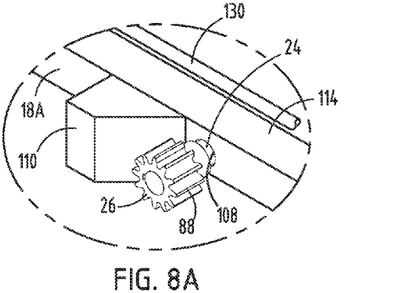
FIG. 8A is an enlarged perspective view of area VIIIA of FIG. 8.
Figure 9:
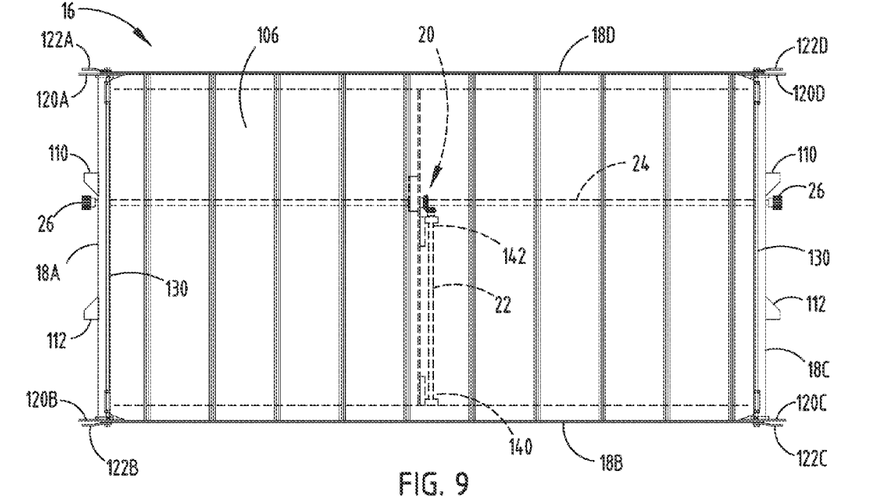
FIG. 9 is a top plan view of a shelf of a adjustable shelving assembly of the present invention.

Referring now to the embodiment illustrated in FIGS. 8 and 9, the plurality of side members 18A, 18B, 18C, and 18D that are operably connected together at corners 101 of the shelf 16 by welding, fasteners, etc. The side members 18B, 18D each include a side support member 102 and a bottom support member 104. The bottom support member 104 is designed to support a removable shelf panel 106 that is adapted to be inserted between the adjoined side members 18A, 18B, 18C, and 18D. The side support member 102 keeps the removable shelf panel in place. The end members or side members 18A, 18C each include a bottom support member 107 and a bottom flange 109, as well as an aperture 108 through which the translational shaft 24 extends. The translational gear 26 is disposed proximate the side members 18A, 18C. However, it is contemplated that the translational gear 26 could be on only one of the side members 18A, 18C. The side members 18A, 18C each have first and second guide blocks 110, 112 disposed at an intermediate portion 114 of the side members 18A, 18C, respectively. The translational gear 26 is disposed between the first and second guide blocks 110, 112. As illustrated in FIG. 8A, the translational gear 26 is positioned adjacent to the first guide block 110. The first and second guide blocks 110, 112 guide the shelf 16 between raised and lowered positions inside the cage 12. The first and second guide blocks 110, 112 are made of or coated with a substantially smooth material having a low coefficient of friction, such as nylon.

Figure 8B:
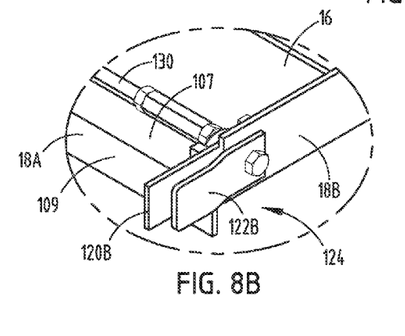
FIG. 8B is an enlarged perspective view of area VIIIB of FIG. 8 with guide tabs in a deployed position.
Figure 8C:
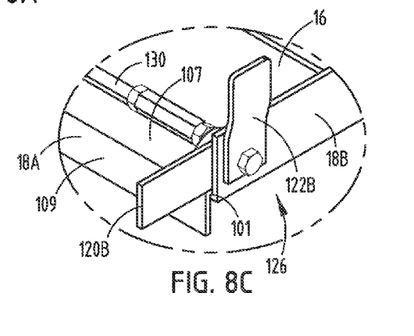
FIG. 8C is an enlarged perspective view of FIG. 8B with the guide tabs in a non-deployed position.

Referring now to FIGS. 8-11, the shelf 16 includes fixed guide tabs 120A, 120B, 120C, and 120D. Movable guide tabs 122A, 122B, 122C, and 122D are also provided and are adjustable between a deployed position 124 (FIG. 8B) and a non-deployed position 126 (FIG. 8C). The fixed guide tabs 120A, 120B, 120C, and 120D may be integral with one of the top and bottom side members 102, 104, or may be fixedly attached thereto. A tie rod 130 is positioned proximate the side member 18A and operably connects with the movable guide tabs 122A and 122B, which are proximate the side member 18A. Likewise, a tie rod 132 is positioned proximate the side member 18C and operably connects with movable guide tabs 122C and 122D, which are proximate the side member 18C. In use, when the shelf 16 has been raised or lowered to a desired position, a user rotates the tie rod 130 and the movable guide tabs 122A and 122B from the non-deployed position 126 to the deployed position 124. The user also rotates the tie rod 132 and the movable guide tabs 122C and 122D from the non-deployed position 126 to the deployed position 124, which consequently secures the shelf 16 in place. When a user wishes to adjust the height of the shelf 16, the user simply rotates the movable guide tabs 122A, 122B, 122C, and 122D from the deployed position 124 to the non-deployed position 126, which allows the user to then adjust the shelf 16 up or down, as explained in further detail below.

Figure 10:
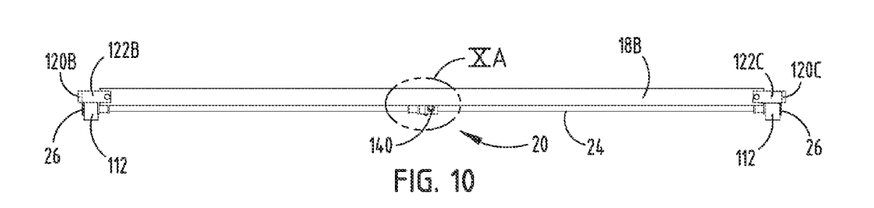
FIG. 10 is a side perspective view of a drive end of the adjustable shelving assembly of FIG. 9.
Figure 10A:
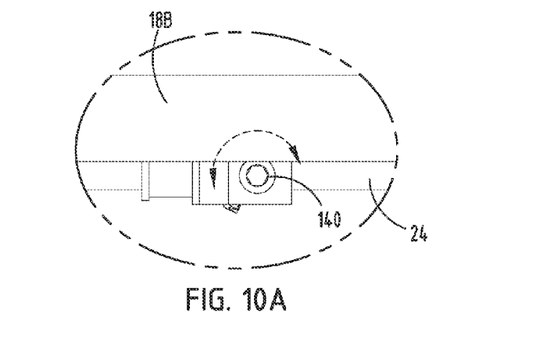
FIG. 10A is an enlarged side perspective view of area XA of FIG. 10.
Figure 11:
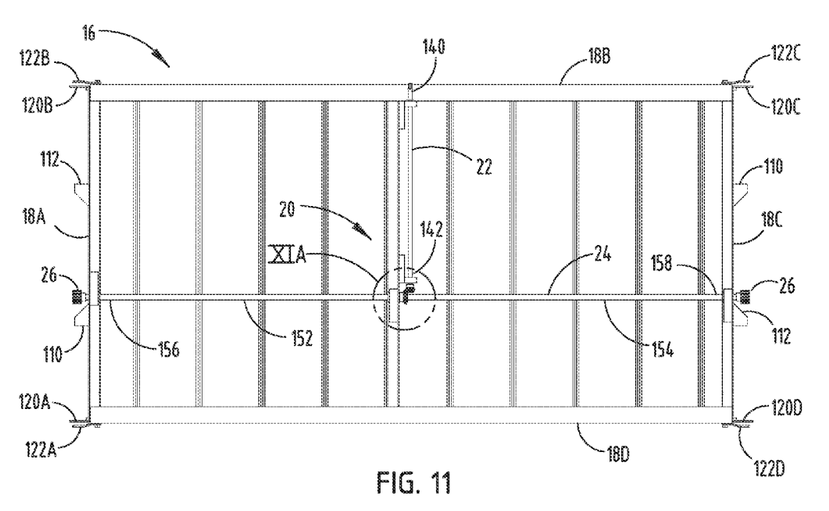
FIG. 11 is a bottom plan view of one embodiment of a shelf of the present invention.
Figure 11A:
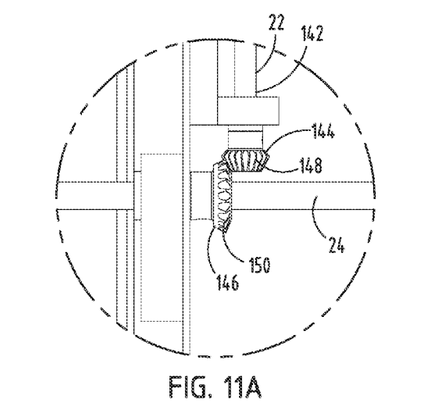
FIG. 11A is an enlarged bottom plan view of area XIA of FIG. 11.

As shown in FIGS. 9-12, the drive shaft 22 extends below the shelf 16. The drive shaft 22 includes a drive end 140 (FIG. 10A) and an engagement end 142 with a drive gear 144 disposed thereon. The drive gear 144 is in communication with a transfer gear 146 disposed on the translational shaft 24. More specifically, the drive gear 144 includes teeth 148 that are aligned with and complement teeth 150 on the transfer gear 146 (FIGS. 11 and 11A). When the drive gear 144 rotates, the transfer gear 146 is also forced to rotate. The transfer gear 146 is generally positioned between a first portion 152 and a second portion 154 of the translational shaft 24. Opposing ends 156, 158 of the translational shaft 24 include the translational gears 26, which interface directly with the vertically-extending toothed rack assemblies 28.

Figure 13:
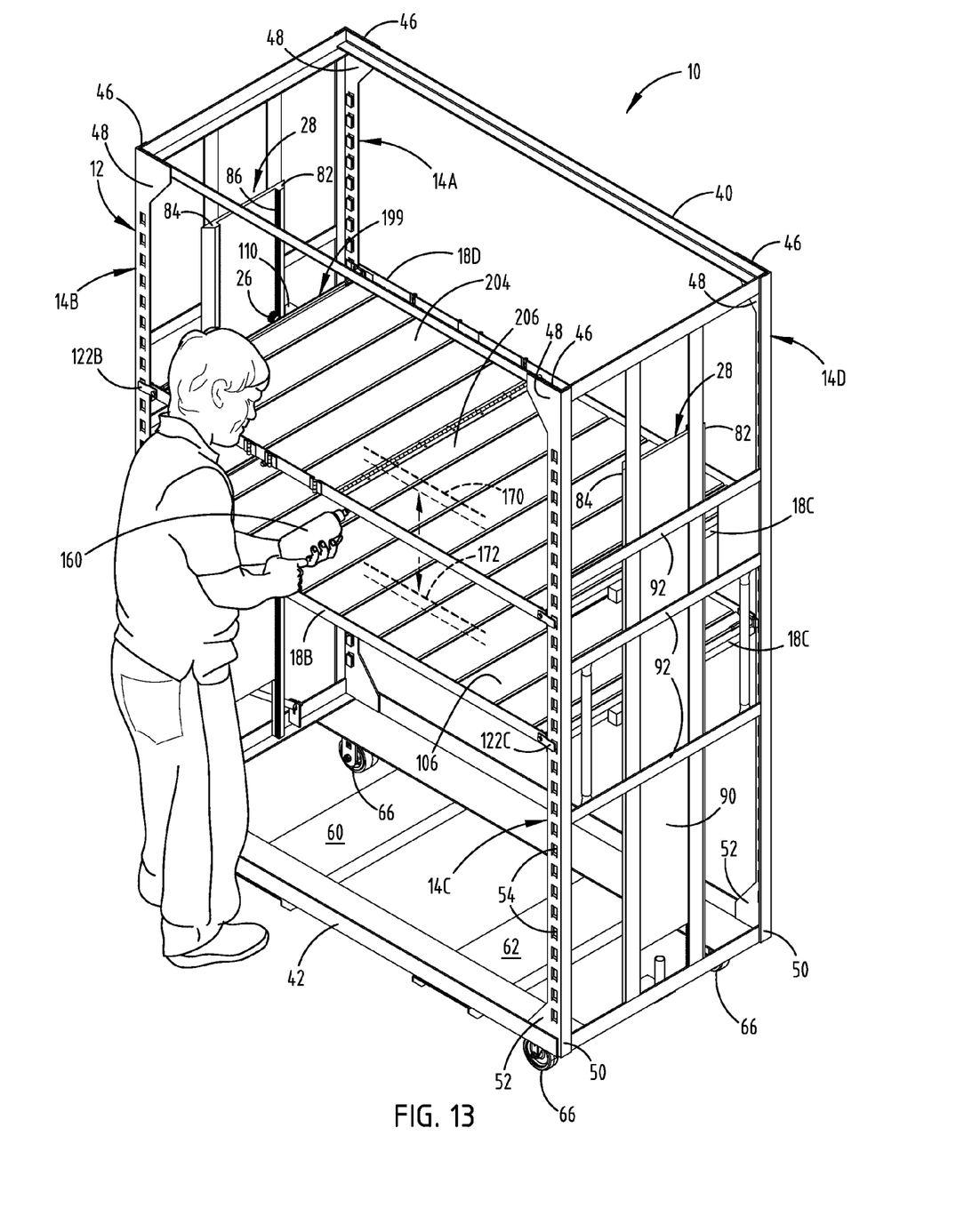
FIG. 13 is a rear perspective view of a adjustable shelving assembly of the present invention.

Referring now to FIG. 13, the shelf 16 is vertically translatable along the support columns 14A, 14B, 14C, and 14D between a plurality of positions generally aligned with the apertures 54 disposed in the support columns 14A, 14B, 14C, and 14D. As stated above, to prepare the shelf 16 for vertical translation, the user simply rotates the movable guide tabs 122A, 122B, 122C, and 122D to the non-deployed position 126, which allows the user to then adjust the shelf 16 up or down. The user can connect the engagement end 142 of the drive shaft 22 with a bit on a device 160 having a rotational engagement member, such as a drill or a screw gun. When the device 160 is actuated and the bit turns clockwise, the bit rotates the drive shaft 22 clockwise, which causes the drive gear 144 to rotate clockwise. The drive gear 144 then rotates the transfer gear 146 and the translational shaft 24, which consequently causes both translational gears 26 to rotate clockwise, thus causing the entire shelf 16 to elevate to a raised position 170. Similarly, when the device 160 is actuated and the bit turns counterclockwise, the bit rotates the drive shaft 22 counterclockwise, which causes the drive gear 144 to also rotate counterclockwise. The drive gear 144 then rotates the transfer gear 146 and the translational shaft 24, which also causes both translational gears 26 to rotate counterclockwise, thus causing the entire shelf 16 to descend to a lowered position 172.

Figure 14:
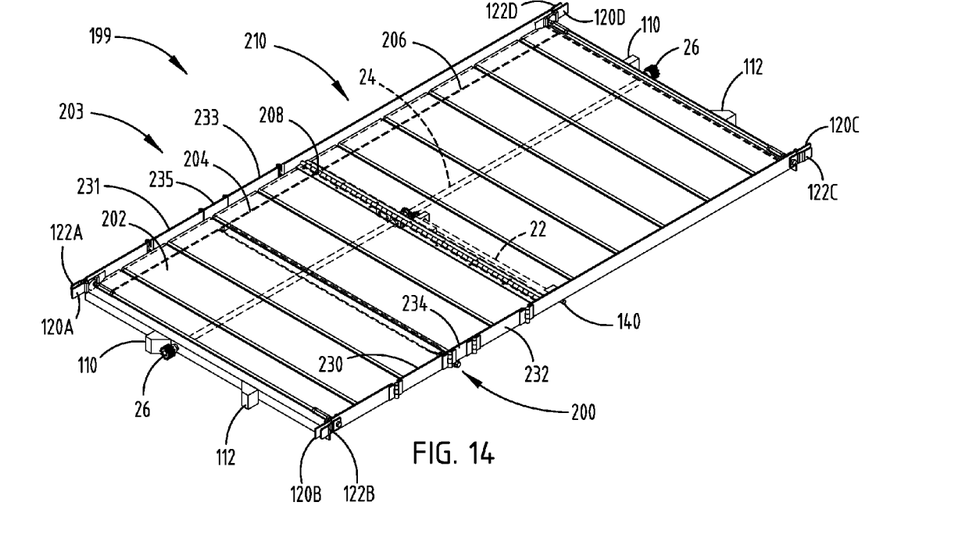
FIG. 14 is a top perspective view of another embodiment of a shelf in an extended position.
Figure 14A:
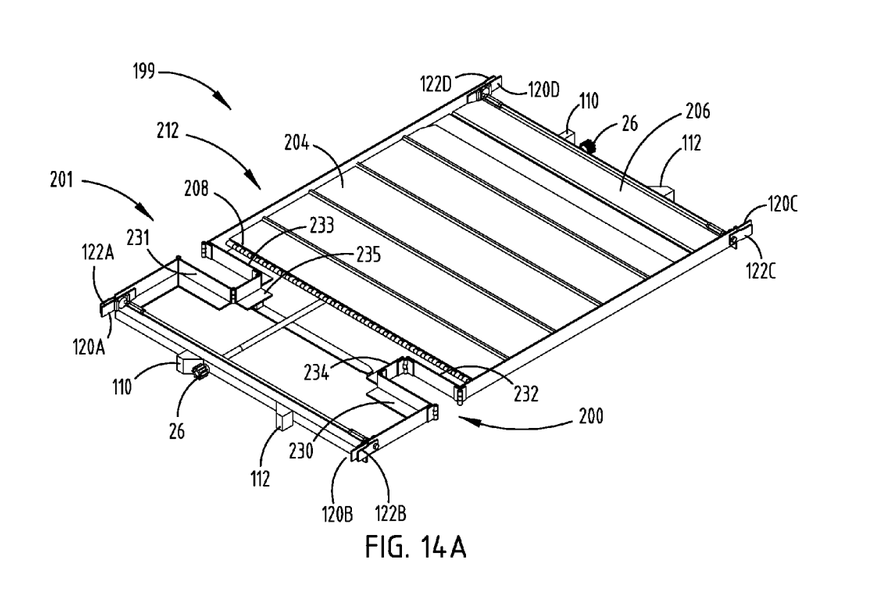
FIG. 14A is a top perspective view of the shelf of FIG. 14 in a collapsed position.
Figure 15:
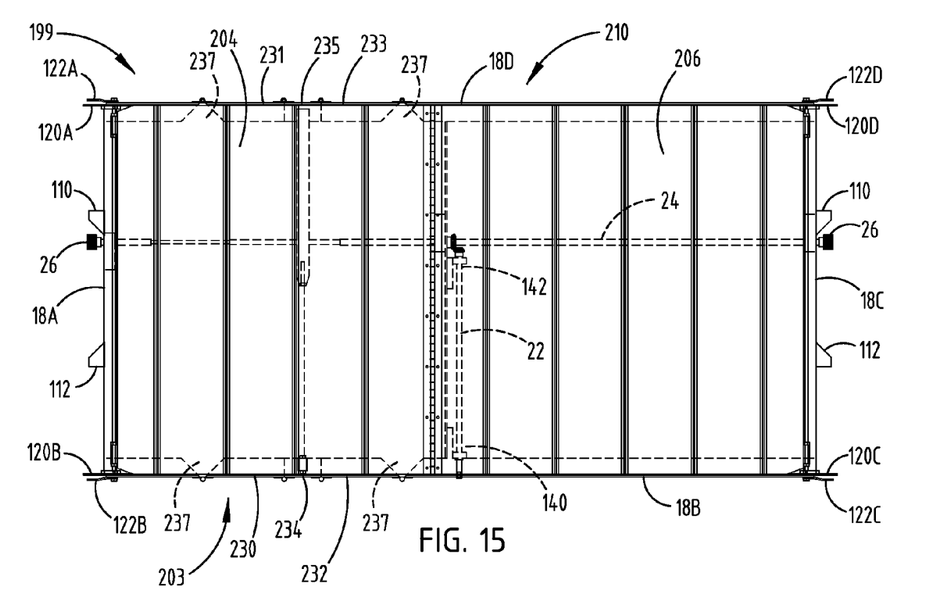
FIG. 15 is a top plan view of the shelf of FIG. 14.
Figure 15A:
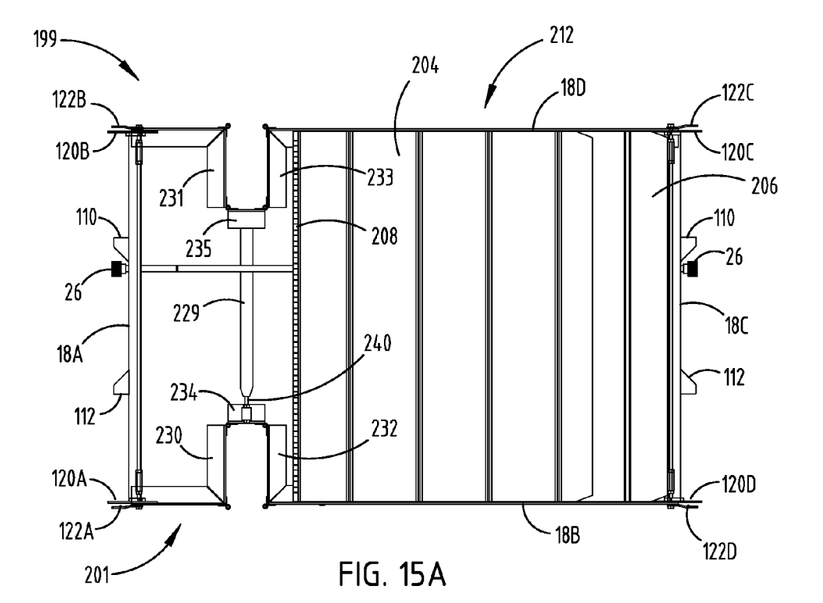
FIG. 15A is a top plan view of the shelf of FIG. 14A.
Figure 16:
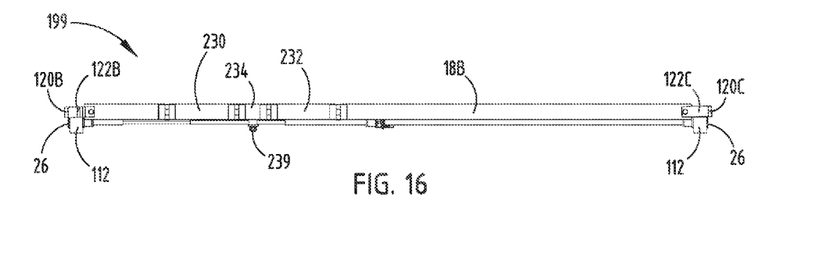
FIG. 16 is a side elevational view of the shelf of FIG. 14.

Referring now to FIGS. 14-15, another embodiment is illustrated, which includes a shelf 199. The shelf 199 includes features similar to those described with reference to shelf 16, and similar features will include the same reference numerals. However, shelf 199 further includes a width adjustment system 200 that allows the width of the shelf 199 to be adjusted to allow easy insertion and removal of the shelf 199 from the cage 12. Thus, the shelf 199 is movable between a collapsed position 201 and an extended position 203. The width adjustment system 200 includes a shelf panel 202 that includes a first panel portion 204 and a second panel portion 206 separated by a hinge 208. The first and second panel portions 204 and 206 are approximately the same size, although it is contemplated that they could be of different sizes. The hinge 208 allows the first panel portion 204 to be rotated between a non-folded position 210 and a folded position 212, wherein the first panel portion 204 overlies the second panel portion 206.

Figure 12:
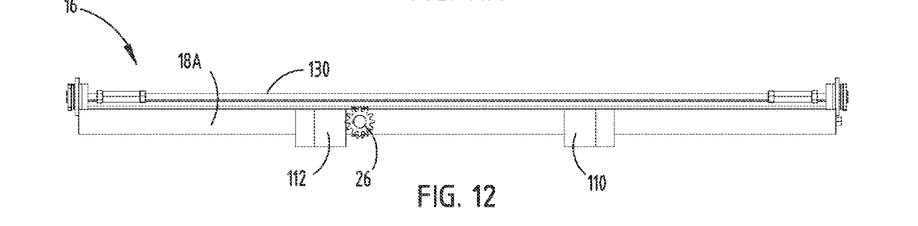
FIG. 12 is a front elevational view of the shelf of FIG. 11.

As shown in FIGS. 14-18 and similar to the embodiment depicted in FIGS. 11 and 12, the drive shaft 22 extends below the shelf 16. The drive shaft 22 includes a drive end 140 and an engagement end 142 with a drive gear 144 disposed thereon. The drive gear 144 is in communication with a transfer gear 146 disposed on the translational shaft 24. More specifically, the drive gear 144 includes teeth 148 that are aligned with and complement teeth 150 on the transfer gear 146. When the drive gear 144 rotates, the transfer gear 146 is also forced to rotate. The transfer gear 146 is generally positioned between a first portion 152 and a second portion 154 of the translational shaft 24. Opposing ends 156, 158 of the translational shaft 24 include the translational gears 26, which interface directly with the vertically-extending toothed rack assemblies 28.

Referring again to FIGS. 14-18, the first portion 152 of the translational shaft 24 includes width adjustment functionality that generally includes a telescoping construction with first, second, and third integrated shaft members 220, 222, 224. The first shaft member 220 is designed to be received in the second shaft member 222. At the same time, the second shaft member 222 is designed for reception in the third shaft member 224.

Figure 17:
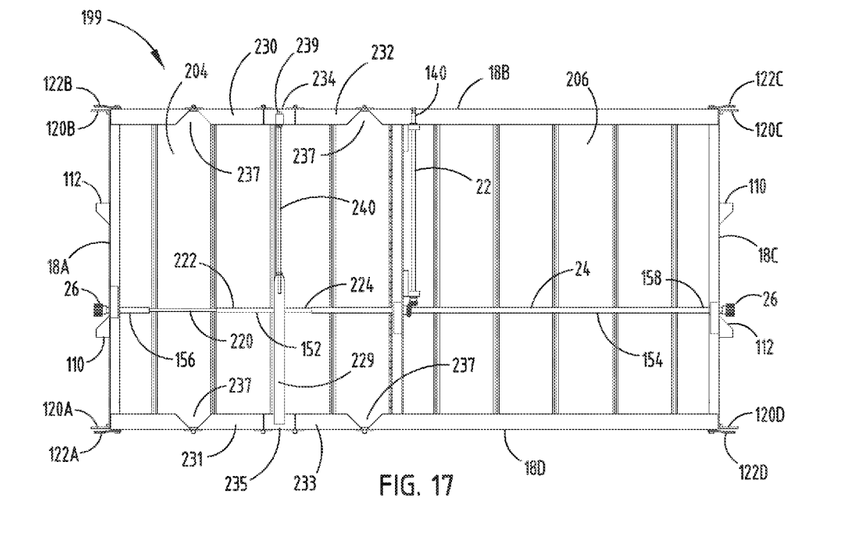
FIG. 17 is a bottom plan view of the shelf of FIG. 14.
Figure 18:
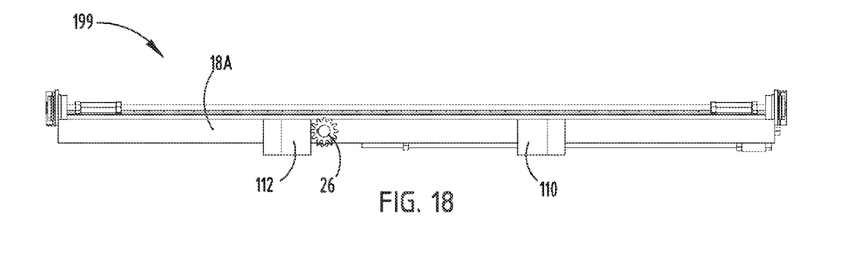
FIG. 18 is a front elevational view of the shelf of FIG. 14.

As shown in FIG. 17, a width adjustment member 229 is positioned below the shelf 199 and is connected to first and second collapsible sections 234, 235 disposed in the side members 18B, 18D. The side member 18B includes first and second pivot frame members 230, 232. Similarly, the side member 18D includes first and second pivot frame members 231, 233. A cutout 237 is disposed on each of the pivot frame members 230, 231, 232, and 233 to provide ample room for the shelf 199 to move to the collapsed position 201. The collapsible section 234 is positioned between the first and second pivot frame members 230, 232, and the collapsible section 235 is positioned between the first and second pivot frame members 231, 233. The collapsible sections 234, 235 are movable between the collapsed position 201 and the extended position 203. The collapsible sections 234, 235 maintain a position that is generally parallel with the remainder of the side members 18B, 18D, when in the collapsed position 201, as well as when placed in the extended position 203. When the collapsible section 234 is placed in the collapsed position 201, the width of the shelf 199 is consequently shortened. The width adjustment member 229 is operably connected with both of the collapsible sections 234, 235.

To remove the shelf 16, a user rotates the first panel portion 204 onto the second panel portion 206 about the hinge 208. The user then operably connects a device 160 having a rotational engagement member, such as a hand crank and/or a drill or a screw gun, with an engagement end 239 of the width adjustment member 229. As illustrated, the width adjustment member 229 is generally in the form of a screw shaft 240. As the rotational engagement member of the device 160 rotates clockwise, the screw shaft 240 draws in the collapsible sections 234, 235 to shorten the shelf 199.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A shelving assembly comprising:
   a frame including a plurality of support columns and a plurality of lateral members;
   a shelf unit having a plurality of sides disposed inside the frame and securing members adapted to secure the shelf unit in position in the shelving assembly;
   a tie rod disposed between and operably connected with the securing members;
   a gear assembly disposed adjacent to one of the plurality of sides of the shelf unit, the gear assembly including:
      a drive shaft;
      a translational shaft having an intermediate portion and a distal end, wherein the intermediate portion is operably connected with the drive shaft; and
      a translational gear disposed on the distal end of the translational shaft; and
   a vertically-extending toothed rack positioned on one of the lateral end members, wherein the vertically-extending toothed rack is operably engaged with the translational gear such that rotation of the drive shaft causes rotation of the translational shaft and rotation of the translational gear which results in vertical translation of the shelf unit.

2. The shelving assembly of claim 1, further comprising:
   a shelf panel that is removably connected with the shelf unit.

3. The shelving assembly of claim 1, further comprising:
   guide blocks disposed on at least one side wall of the shelf unit.

4. The shelving assembly of claim 1, wherein the shelf unit includes a plurality of shelf frame members, wherein at least one hinged connection is disposed in at least one of the plurality of shelf frame members.

5. The shelving assembly of claim 3, further comprising:
   an angled guide wall disposed between the support columns and on the toothed rack, wherein the angled guide wall is slidably engaged with one of the guide blocks.

6. A shelving assembly comprising:
   a frame including a plurality of support columns;
   a shelf unit disposed inside the frame and having first and second end members;
   a shelf panel that is removably connected with the shelf unit;
   a first gear assembly disposed adjacent to at least one of the first and second end members, the gear assembly adapted to vertically translate the shelf unit between raised and lowered positions inside the frame; and a second gear assembly including:
a width adjustment shaft; and
an elongate width adjustment member operably connected with the width adjustment shaft, wherein actuation of the width adjustment member causes the width adjustment shaft to retract at least one of the first and second end members, thereby causing the distance between the first and second end members to decrease.

7. The shelving assembly of claim 6, further comprising: securing members disposed on the shelf unit and adapted to secure the shelf unit in position in the shelving assembly.

8. The shelving assembly of claim 6, further comprising: guide blocks disposed on at least one side wall of the shelf unit.

9. The shelving assembly of claim 6, wherein the shelf unit includes a plurality of shelf frame members, wherein at least one hinged connection is disposed in at least one of the plurality of shelf frame members.

10. The shelving assembly of claim 8, further comprising: an angled guide wall disposed between the plurality of support columns and on the toothed rack, wherein the angled guide wall is slidably engaged with one of the guide blocks.

* * * * *